(12) United States Patent
Villarreal, Jr. et al.

(10) Patent No.: US 10,106,718 B2
(45) Date of Patent: Oct. 23, 2018

(54) EXPANDABLE COATING FOR SOLID PARTICLES AND ASSOCIATED METHODS OF USE IN SUBTERRANEAN TREATMENTS

(71) Applicant: Halliburton Energy Services, Inc., Houston, TX (US)

(72) Inventors: Alfredo Villarreal, Jr., Houston, TX (US); William Walter Shumway, Spring, TX (US)

(73) Assignee: Halliburton Energy Services, Inc., Houston, TX (US)

(*) Notice: Subject to any disclaimer, the term of this patent is extended or adjusted under 35 U.S.C. 154(b) by 0 days.

(21) Appl. No.: 15/425,525

(22) Filed: Feb. 6, 2017

(65) Prior Publication Data

US 2017/0145283 A1 May 25, 2017

Related U.S. Application Data

(62) Division of application No. 13/677,527, filed on Nov. 15, 2012, now Pat. No. 9,598,927.

(51) Int. Cl.
*C09K 8/035* (2006.01)
*C09K 8/516* (2006.01)
(Continued)

(52) U.S. Cl.
CPC .............. *C09K 8/035* (2013.01); *C09K 8/032* (2013.01); *C09K 8/516* (2013.01); *E21B 21/003* (2013.01);
(Continued)

(58) Field of Classification Search
None
See application file for complete search history.

(56) References Cited

U.S. PATENT DOCUMENTS

| 3,336,979 A | 8/1967 | Ingraham et al. |
| 4,836,940 A | 6/1989 | Alexander |
| (Continued) | | |

FOREIGN PATENT DOCUMENTS

| CA | 2260446 | 7/1999 |
| WO | 2009069057 | 6/2009 |
| WO | 201303391 | 7/2013 |

OTHER PUBLICATIONS

Supplementary European Search Report for European Application No. RP13855577 dated Jun. 29, 2016.
(Continued)

*Primary Examiner* — John J Figueroa
(74) *Attorney, Agent, or Firm* — Tenley Krueger; Tumey L.L.P.

(57) ABSTRACT

A variety of methods and compositions are disclosed, including, in one embodiment, a method of treating a subterranean formation comprising: providing coated particles, wherein the coated particles comprise solid particles coated with an expandable coating; and introducing the coated particles into a permeable zone of the subterranean formation such that the coated particles form a barrier to fluid flow in the permeable zone. In another embodiment, a method of drilling a well bore may be provided, the method comprising: including coated particles in a drilling fluid, the coated particles comprising solid particles coated with an expandable coating; using a drill bit to enlarge the well bore; and circulating the drilling fluid past the drill bit.

20 Claims, 1 Drawing Sheet

(51) Int. Cl.
  *E21B 21/00* (2006.01)
  *E21B 33/138* (2006.01)
  *C09K 8/03* (2006.01)

(52) U.S. Cl.
  CPC ........ *E21B 33/138* (2013.01); *C09K 2208/04* (2013.01)

(56) References Cited

U.S. PATENT DOCUMENTS

| | | | |
|---|---|---|---|
| 4,971,833 A | 11/1990 | Larsson et al. | |
| 6,109,350 A | 8/2000 | Nguyen et al. | |
| 6,777,377 B2 | 8/2004 | Myers | |
| 6,851,701 B2 | 2/2005 | Tomchak et al. | |
| 7,063,150 B2 | 6/2006 | Slabaugh et al. | |
| 7,066,285 B2 | 6/2006 | Shaarpour | |
| 7,117,942 B2 | 10/2006 | Dalrymple | |
| 7,252,146 B2 | 8/2007 | Slabaugh et al. | |
| 7,264,051 B2 | 9/2007 | Nguyen et al. | |
| 7,308,939 B2 | 12/2007 | Welton et al. | |
| 7,350,571 B2 | 4/2008 | Nguyen et al. | |
| 7,407,010 B2 | 8/2008 | Rickman et al. | |
| 7,560,418 B2 | 7/2009 | Bell | |
| 7,607,482 B2 | 10/2009 | Roddy et al. | |
| 7,607,484 B2 | 10/2009 | Roddy et al. | |
| 7,617,870 B1 | 11/2009 | Roddy et al. | |
| 7,647,970 B2 | 1/2010 | Mueller et al. | |
| 7,749,941 B2 | 7/2010 | Maresh | |
| 7,776,797 B2 | 8/2010 | Allin et al. | |
| 7,799,744 B2 | 9/2010 | Welton et al. | |
| 7,866,393 B2 | 1/2011 | Badalamenti et al. | |
| 7,927,419 B2 | 4/2011 | Roddy et al. | |
| 7,934,554 B2 | 5/2011 | Roddy | |
| 7,938,186 B1 | 5/2011 | Badalamenti et al. | |
| 7,954,549 B2 | 6/2011 | Lende et al. | |
| 7,998,910 B2 | 8/2011 | Todd | |
| 8,030,253 B2 | 10/2011 | Roddy et al. | |
| 8,091,638 B2 | 1/2012 | Dusterhoft | |
| 8,181,703 B2 | 5/2012 | Sierra | |
| 8,251,141 B2 | 8/2012 | Eoff | |
| 2005/0194141 A1 | 9/2005 | Sinclair et al. | |
| 2005/0199401 A1 | 9/2005 | Patel et al. | |
| 2006/0175059 A1 | 8/2006 | Sinclair et al. | |
| 2007/0088100 A1 | 4/2007 | Ahmed et al. | |
| 2008/0142222 A1 | 6/2008 | Howard et al. | |
| 2009/0176667 A1 | 7/2009 | Nguyen | |
| 2009/0264322 A1 | 10/2009 | Morris et al. | |
| 2009/0314488 A1 | 12/2009 | Droger et al. | |
| 2010/0038086 A1* | 2/2010 | Bunnell ............... C09K 8/5083 166/300 |
| 2010/0163252 A1 | 7/2010 | Regnault et al. | |
| 2011/0028593 A1 | 2/2011 | Roddy et al. | |
| 2011/0028594 A1 | 2/2011 | Roddy et al. | |
| 2011/0036583 A1 | 2/2011 | Willberg et al. | |
| 2011/0098377 A1 | 4/2011 | Huang et al. | |
| 2011/0160096 A1 | 6/2011 | Roddy | |
| 2011/0237468 A1 | 9/2011 | Reichenback-Klinke et al. | |
| 2012/0172261 A1 | 7/2012 | Roddy et al. | |
| 2012/0172518 A1 | 7/2012 | Roddy et al. | |

OTHER PUBLICATIONS

Canadian Office Action for Canadian Application No. 2,888,836 dated Apr. 15, 2016.
International Search Report and Written Opinion for Application No. PCT/US2013/070405 dated Feb. 27, 2014.
HES Brochure "FUSE-IT Lost Circulation Treatment" dated May 2006.
HES Brochure Thermatek Service dated May 2005.
HES Brochure Baracarb dated Mar. 23, 2010.
HES Brochure EZ-PLUG dated Sep. 7, 2010.
HES Brochure Duo-Squeeze H dated Apr. 2008.
HES Brochure N-Squeeze dated Mar. 26, 2010.
HES Brochure STEELSEAL dated Mar. 26, 2010.
HES Brochure LO-Gard Service dated Mar. 2007.
HES Brochure Mixromax weight additive dated Aug. 2007.
HES Brochure Hi-Dense weight additive dated Aug. 2007.
HES Brochure SSA-1 weight additive dated Aug. 2007.
USPTO Office Action for U.S. Appl. No. 13/677,527 dated Jun. 30, 2016.
USPTO Office Action for U.S. Appl. No. 13/677,527 dated Mar. 13, 2015.
USPTO Final Office Action for U.S. Appl. No. 13/677,527 dated Oct. 5, 2015.
USPTO Notice of Allowance for U.S. Appl. No. 13/677,527 dated Dec. 16, 2016.

* cited by examiner

EXPANDABLE COATING FOR SOLID PARTICLES AND ASSOCIATED METHODS OF USE IN SUBTERRANEAN TREATMENTS

CROSS-REFERENCE TO RELATED APPLICATIONS

The present invention is a divisional application of U.S. patent application Ser. No. 13/677,527, filed on Nov. 15, 2012, the entire disclosure of which is incorporated herein by reference.

BACKGROUND

The present invention relates to subterranean treatments and, more particularly, in certain embodiments, to methods and compositions that utilize solid particles having an expandable coating in subterranean treatments.

In subterranean operations, there may be instances where it can be desirable to limit or prevent the flow a fluid into or through a particular portion of the subterranean formation or well bore. For example, it may be desirable to limit or prevent the loss of circulation of fluids, such as drilling fluids, into the subterranean formation. Such fluids may be lost into fractures induced by excess fluid pressures, into pre-existing fractures, or into large openings with structural strength in the formation, among other locations. This problem may be referred to as "lost circulation," and the sections of the formation into which the drilling fluid may be lost may be referred to as "lost-circulation zones." The loss of drilling fluids into the formation is undesirable, inter alia, because of the expense associated with the drilling fluid lost into the formation, loss of time, additional casing strings and, in extreme conditions, well abandonment. In addition to drilling fluids, problems with lost circulation may also be encountered with other fluids, for example, spacer fluids, completion fluids (e.g., completion brines), fracturing fluids, and cement compositions that may be introduced into a well bore.

In other instances, it may be desirable to limit or prevent the flow of water, which may be undesirably produced in subterranean operations. For example, when hydrocarbons are produced from wells that penetrate hydrocarbon-producing formations, water often accompanies the hydrocarbons, particularly as the wells mature over time. The water can be the result of a water-producing zones communicating with the hydrocarbon-producing formations or zones by fractures, high-permeability streaks, and the like. Alternatively, the water can be caused by a variety of other occurrences which are well known in the art, including water coning, water cresting, bottom water, channeling at the well bore, etc. The production of water adds undesired expense and complexity to the production of the hydrocarbons.

A number of different techniques have been developed to limit or prevent fluid flow into or through a particular portion of the subterranean formation or well bore, which may be useful in the prevention lost circulation and/or control of the undesirable production of water. In some instances, chemical systems have been used to limit or prevent fluid flow. One type of chemical system that has been used is chemical gels that resist the flow of injected fluids or the natural aqueous drive fluid through high permeability channels and fractures. The general approach has been to inject a mixture of reagents, initially low in viscosity, into a zone of the formation that has high permeability. After a sufficient time to allow the mixture to be pumped into the subterranean formation or when exposed to the elevated temperature of the formation, the mixture of reagents then forms a gel to block fluid flow. In addition, chemical systems commonly referred to as "relative permeability modifiers" have also been used to decrease the production of water. One example of a commonly used relative permeability modifier is polyacrylamide. These methods typically work at the formation face and/or well bore; however, in some instances formation damage may occur.

In addition to chemical systems, additional techniques that have been used for lost circulation control involve the placement of lost-circulation materials into the lost circulation zone. Conventional lost-circulation materials may include fibrous, lamellated or granular materials. The lost-circulation materials may be placed into the formation, inter alia, as part of a drilling fluid or as a separate lost-circulation pill in an attempt to control and/or prevent lost circulation. The lost-circulation materials typically form a seal in the lost-circulation zone (e.g., by packing off perforation tunnels, plating off a formation surface, plating off a hole behind a slotted liner, or packing along the surface of a hydraulic fracture) that prevents loss circulation of the drilling or other fluid into the formation. However, it is often desired to subsequently remove the lost-circulation materials to allow the maximum flow of produced fluids that comprise hydrocarbons from the subterranean zone to flow into the well bore. Subsequent operations necessary for removing such lost-circulation materials often entail considerable time and expense and added complications.

SUMMARY

An embodiment of the present invention provides a method of treating a subterranean formation comprising: providing coated particles, wherein the coated particles comprise solid particles coated with an expandable coating; and introducing the coated particles into a subterranean formation.

Another embodiment of the present invention provides a method of drilling a well bore comprising: including coated particles in a drilling fluid, the coated particles comprising solid particles coated with an expandable coating; using a drill bit to enlarge the well bore; and circulating the drilling fluid past the drill bit.

Another embodiment of the present invention provides a subterranean treatment fluid comprising: a base fluid; and coated particles, wherein the coated particles comprise solid particles coated with an expandable coating.

The features and advantages of the present invention will be readily apparent to those skilled in the art. While numerous changes may be made by those skilled in the art, such changes are within the spirit of the invention.

BRIEF DESCRIPTION OF THE DRAWINGS

These drawings illustrate certain aspects of some of the embodiments of the present invention, and should not be used to limit or define the invention.

DESCRIPTION OF PREFERRED EMBODIMENTS

The present invention relates to subterranean treatments and, more particularly, in certain embodiments, to methods and compositions that utilize solid particles having an expandable coating in subterranean treatments. While the coated particles may be useful in a number of different applications, they may be particularly useful for controlling fluid flow in subterranean formations.

There may be several potential advantages to the methods and compositions of the present invention, only some of which may be alluded to herein. One of the many potential advantages of the methods and compositions of the present invention may be that the expandable coating on the solid particles may expand, for example, when contacted by an actuating fluid such as oil or water in a subterranean formation, allowing the solid particles to create a barrier that is substantially impermeable to fluids, such as water, oil, and/or gas. Another potential advantage of the expandable coating is that expansion of the expandable particles may be used to change the rheology profile of a fluid in which the solid particles are included. Another potential advantage of the methods and compositions of the present invention may be that this expansion of the coating in response to fluids may be controlled by a trigger. For example, a chemical trigger such as changing salinity or incorporation of divalent ions may be used to control the expansion of the coating. In some instances, the trigger may be a thermal or pressure trigger such that the expansion of the coating may be controlled by temperature or pressure. Yet another potential advantage may be that the expansion of the coating may be reversible. For example, the trigger may be used to collapse the coating and allow the solid particles to be removed from the subterranean formation. A particular benefit to removing the solid particles from the formation may be where the solid particles were used to create a barrier in a portion of the subterranean formation through which it is later to desired to produce hydrocarbons.

Figure 1:
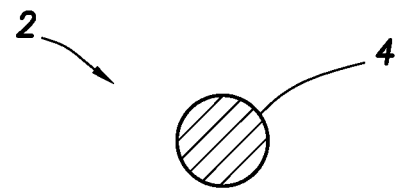
FIG. 1 illustrates an example embodiment of an uncoated solid particle.
Figure 2:
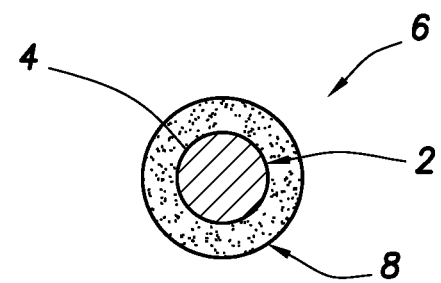
FIG. 2 illustrates an example embodiment of a coated particle in an unexpanded configuration.
Figure 3:
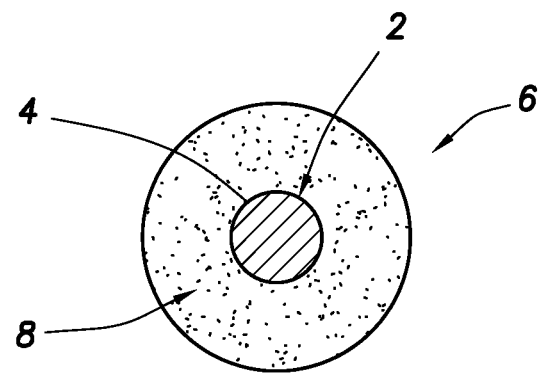
FIG. 3 illustrates an example embodiment of a coated particle in an expanded configuration.

In accordance with present embodiments, a solid particle may be coated with an expandable coating. As used herein, the terms "coat," "coating," "coated," and the like are not intended to imply the extent of coverage of the expandable coating on the solid particle, but rather are intended to refer to the expandable coating being disposed on an exterior surface of the solid particle. FIG. 1 illustrates a solid particle 2 having an exterior surface 4. As illustrated, there is no expandable coating on the solid particle 2. FIG. 2 illustrates a coated particle 6 that comprises a solid particle 2 and an expandable coating 8 disposed on the exterior surface 4 of the solid particle 2. FIG. 2 illustrates the expandable coating 8 in a collapsed or unexpanded configuration. In accordance with present embodiments, the expandable coating 8 may be expanded, thus increasing the volume of the coated particle 6. In some embodiments, the expandable coating 8 may absorb a fluid to expand and increase in volume. FIG. 3 illustrates the coated solid particle 6 having the expandable coating in an expanded configuration.

The solid particle may include any of a variety of different solid particles that can be utilized in subterranean treatments, including weighting agents and lost circulation materials, for example. Lost circulation materials are typically solid particles that can be included in subterranean treatment fluids, such as drilling fluids and cement compositions, among others, to reduce and potentially even prevent the loss of fluid circulation into the formation. Examples of lost circulation materials that may be used include ground peanut shells, mica, cellophane, ground walnut shells, calcium carbonate, plant fibers, cottonseed hulls, ground rubber, polymeric materials, petroleum coke, graphitic carbon, and combinations thereof. Weighting agents are typically solid particles that weigh more than water and may be used to increase the density of the fluid into which the weighting agents are incorporated. By way of example, weighting agents may have a specific gravity of about 2 or greater (e.g., about 3 or greater, about 4 or greater, etc.). In particular embodiments, the weight agent may have a specific gravity of about 2.2 or greater. Weighting agents may be selected as the solid particle where it is desired for the coated particle to have a dual function, in that the coated particle may be used to modify the density of a treatment as well as controlling fluid flow. Examples of weighting agents that may be used include, but are not limited to, hematite, hausmannite, barite, sand (e.g., silica flour), cement, Illmanite, calcium carbonate, manganese oxides (e.g., manganese tetraoxide), and combinations thereof. Specific examples of suitable weighting agents include MICROMAX® weight additives, HI-DENSE® weighting agent, and SSA-1™ cement additive, all available from Halliburton Energy Services, Inc.

The solid particles may have a variety of different physical shapes, including the physical shape of platelets, shavings, fibers, flakes, ribbons, rods, strips, spheroids, toxoids, pellets, tablets, or any other suitable shape. In some embodiments, the solid particles may have a d50 in a range of from about 1 micron to about 2500 microns. In alternative embodiments, the solid particles may have a d50 in a range of from about 3 microns to about 1200 microns. However, particle size distributions outside these defined ranges may also be suitable for particular applications.

The expandable coating may include any of a variety of different materials that may expand to effect an increase in volume for the coated particles. In some embodiments, the expandable coating may comprise a swellable material that swells from an unexpanded configuration to an expanded configuration when contacted by an actuating fluid. By way of example, the swellable material may swell from the unexpanded to the expanded configuration when it comes into contact with or absorbs the actuating fluid. Examples of suitable actuating fluids include water, such as freshwater, saltwater, and the like, and oils, such as crude oil, diesel oil, kerosene and the like. In some embodiments, the actuating fluid may be naturally present in the formation such that the swellable material contacts it after placement into the formation. In alternative embodiments, the actuating fluid may be a carrier fluid used to place the swellable material in the formation. In further embodiments, the coated particle may be pre-expanded such that the coated particle contacts the actuating fluid prior to incorporation into a treatment fluid.

In some embodiments, the expandable coating may comprise a material that swells when it comes into contact with or absorbs water. Examples of suitable water-swellable materials include water-swellable polymers, such as those commonly referred to as "superabsorbent polymers." Superabsorbent polymers are characterized by their ability to absorb up to 500 times or even more their own weight in water. Those of ordinary skill in the art will appreciate that the absorption and, thus, swelling of superabsorbent polymers may be highly impacted by salinity. For example, the presence of valence cations can greatly impact the absorption capabilities of some superabsorbent polymers. In some embodiments, the superabsorbent polymers may be classified as a hydrogel. Examples of suitable superabsorbent polymers may include polyacrylates (e.g., polymethacrylate), polyacrylamide, starch-polyacrylate acid graft copolymers, polyethylene oxide polymers, carboxymethyl cellulose type polymers, poly(acrylic acid) and salts thereof, poly(acrylic-co-acrylamide), graft-poly(ethylene oxide) of poly(acrylic acid), poly(2-hydroxyethyl methacrylate), poly (2-hydroxypropyl methacrylate), polyvinyl alcohol cyclic acid anhydride graft copolymer, isobutylene maleic anhydride copolymer, vinylacetate-acrylate copolymer, and starch-polyacrylonitrile graft copolymers. Combinations of suitable superabsorbent polymers may also be suitable. Other water-swellable materials that behave in a similar fashion with respect to water may also be suitable. For example, a starch or mixture of starches may be used including wheat starch, corn starch, maize starch, waxy maize starch, potato starch, tapioca starch, and the like. In some embodiments, the starch may be a modified starch. An additional example of a material that may be water swellable includes hydrophobically modified polymers. As used herein, the term "hydrophobically modified" refers to the incorporation into the hydrophilic polymer structure of hydrophobic groups, wherein the alkyl chain length is from about 4 to about 22 carbons. Specifically examples of hydrophilic polymers that may be modified include homo-, co-, or terpolymers such as, but not limited to, polyacrylamides, polyvinylamines, poly(vinylamines/vinyl alcohols), and alkyl acrylate polymers in general. Additional examples of alkyl acrylate polymers include, but are not limited to, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly(acrylic acid/dimethylaminopropyl methacrylamide), and poly(methacrylic acid/dimethylaminopropyl methacrylamide). Examples of suitable hydrophobically modified polymers are described in more detail in U.S. Pat. No. 7,117,942, the disclosure of which is incorporated herein by reference. Those of ordinary skill in the art, with the benefit of this disclosure, will be able to select an appropriate water-swellable material for use in embodiments of the present invention based on a variety of factors, including the application in which the composition will be used and the desired swelling characteristics.

In some embodiments, the expandable coating may comprise a material that swells when it comes into contact with or absorbs oil. Oil-swellable materials that should be used in embodiments of the weighted elastomer include any of a variety of materials that swell upon contact with oil. Some specific examples of suitable oil-swellable materials include swellable elastomers, such as natural rubber, polyurethane rubber, nitrile rubber, hydrogenated nitrile rubber, acrylate butadiene rubber, polyacrylate rubber, butyl rubber, brominated butyl rubber, chlorinated butyl rubber, chlorinated polyethylene rubber, isoprene rubber, chloroprene rubber, neoprene rubber, butadiene rubber, styrene butadiene copolymer rubber, sulphonated polyethylene, ethylene acrylate rubber, epichlorohydrin ethylene oxide copolymer rubber, ethylene-propylene-copolymer (peroxide cross-linked), ethylene-propylene-copolymer (sulphur cross-linked), ethylene-propylene-diene terpolymer rubber, ethylene vinyl acetate copolymer, fluoro rubbers, fluoro silicone rubbers, silicone rubbers, poly 2,2,1-bicyclo heptene (polynorborneane), alkylstyrene, and crosslinked substituted vinyl acrylate copolymers. Combinations of suitable swellable elastomers may also be used. Other oil-swellable materials that behave in a similar fashion with respect to oil also may be suitable. Those of ordinary skill in the art, with the benefit of this disclosure, will be able to select an appropriate oil-swellable material for use in embodiments of the present invention based on a variety of factors, including the application in which the composition will be used and the desired swelling characteristics.

Embodiments of the swellable materials may be dual oil/water swellable, in that the swellable material may comprise a combination or mixture of both oil-swellable and water-swellable materials. A swellable material is characterized as "dual oil/water-swellable" when it swells upon contact with or absorption of both oil and water.

The expandable coating may be applied to the surface of the solid particles using any suitable technique. The coating process may be a continuous or batch process. Examples of suitable techniques for coating the solid particles include spray drying, fluidized-bed coating, and batch mixing. The amount of the expandable coating used in embodiments may depend on a number of factors, including the particular expandable coating and the specific end-use application. In certain embodiments, the coated particle may have a weight ratio of the expandable coating to the solid particle of about 99:1 to about 0.1:1 and, alternatively, a weight ratio of about 3:1 to about 0.5:1. While the expandable coating may be attached to the outer surface of the solid particles, the expandable coating does not necessarily coat the entire outer surface. In other words, at least a portion of the surface of the solid particles may remain uncovered in certain embodiment even after coating with the expandable coating. In certain embodiments, at least about 1% (e.g., about 1%, about 5%, about 10% or more) of the surface of the solid particles may be uncovered.

Swellable materials suitable for use in embodiments of the present invention may generally swell by up to about 500% of their original size when contacted by the actuating fluid. For example, the swelling may be at least 10%, at least about 50%, or at least about 100%. Under downhole conditions, this swelling may be more or less depending on the conditions presented. In some embodiments, the swelling may be up to about 200% under downhole conditions. However, as those of ordinary skill in the art, with the benefit of this disclosure, will appreciate, the actual swelling of the swellable material may vary, for example, based on the amount of the swellable material used, temperature, pressure, salinity, and divalent ion concentration, among other factors.

According to present embodiments, a trigger may be used to activate/de-activate the swelling of the swellable materials. For example, the trigger may activate the swelling of the swellable materials such that the swellable materials may swell from the unexpanded to the expanded configuration when they come into contact with or absorb the actuating fluid. By way of further example, the trigger may alternatively be used to de-activate the swelling such that the swellable material may desorb some or even all the actuating fluid and, thus, decrease in volume. In some embodiments, the trigger may change the rate of swelling, for example, increasing or decreasing the rate of which the swellable material absorbs the actuating fluid. In some instances, the trigger may be a thermal or pressure trigger such that the expansion of the coating may be controlled by temperature or pressure. In alternative embodiments, the trigger may be a chemical trigger—such as changing salinity or incorporation of divalent ions—may be used to control the expansion of the coating.

In some embodiments, a thermal trigger may be used to activate/de-activate the swelling of the swellable materials. In some embodiments, when the swellable material is exposed to an appreciably high temperature, the swelling may be triggered such that the swellable materials may swell from the unexpanded to the expanded configuration when it comes into contact with or absorbs the actuating fluid. It is believed that in some embodiments in which the subterranean temperature is at least 100° C. or higher, the swelling of the materials may be activated. It is further believed that higher temperatures, in some embodiments, may cause the swelling to occur more quickly, e.g., the swelling more occur more quickly at a temperature of 120° C. than at a temperature of 100° C. In alternative embodiments, when the swellable material is exposed to an appreciably high temperature, the swelling may be de-activated such that the swellable materials may desorb some or even all the actuating fluid causing the swellable material to decrease in volume.

In some embodiments, a pressure trigger may be used to activate/de-activate the swelling of the swellable materials. In some embodiments, when the swellable material is exposed to an appreciably high pressure, the swelling may be triggered such that the swellable materials may swell from the unexpanded to the expanded configuration when it comes into contact with or absorbs the actuating fluid. In alternative embodiments, when the swellable material is exposed to an appreciably high pressure, the swelling may be de-activated such that the swellable materials may desorb some or even all the actuating fluid causing the swellable material to decrease in volume. The pressure trigger, in some embodiments, may be the subterranean formation pressure or a shut-in pressure.

In some embodiments, a chemical trigger may be used to activate/de-activate the swelling of the swellable materials. The chemical trigger may include salinity and/or divalent ion concentration, among others. In some embodiments, a fluid comprising a dissolvent salt and/or divalent ions may be used to control swelling. For example, swelling of certain swellable materials may be de-activated by increasing salinity and/or incorporation of divalent ions, such as calcium ions. In certain embodiments, the swelling of the swellable material may be de-activated in a fluid having a salinity of 0.5% such that the absorbency of the swellable may drop by 50% or more. For example, polyacrylamide can absorb up to 500 times its volume in fresh water, but at 0.9% salinity (NaCl), it absorbency can drop to 50%. In addition, a small amount of calcium chloride could shut off swelling. Accordingly, salinity and/or calcium ions may be used to control the expansion of the swellable material. In some embodiments, salinity and/or calcium ions may also be used to regulate the rate of swelling. For example, at a given temperature, a swellable material in a fluid having a certain salinity and/or calcium ion concentration may reach an expanded configuration more slowly than when the fluid has a reduced salinity and/or calcium ion concentration.

In accordance with embodiments of the present invention, the coated particles may be incorporated into a treatment fluid. As used herein, the term "treatment fluid" refers to any fluid that may be used in conjunction with a desired function and/or for a desired purpose. The term "treatment fluid" does not imply any particular action by the fluid or any component thereof. Similarly, the term "treatment" or "treating," as used herein, refers to any subterranean operation performed in conjunction with a desired function and/or for a desired purpose. The term "treatment" does not imply any particular action. In some embodiments, the coated particles may be introduced into the treatment fluid directly prior to be introduced into a subterranean formation in an "on-the-fly treatment." In an on-the-fly treatment, a flowing stream is continuously introduced into another flowing stream so that the streams are combined and mixed while continuing to flow as a single stream as part of an on-going treatment. For example, the coated particles may be mixed with a treatment fluid on the fly as the treatment fluid is being delivered to the subterranean formation. Such mixing may also be described as "real-time" mixing. As will be understood by those of ordinary skill, the coated particles may also be incorporated into a treatment fluid using other mixing techniques, such as batch or partial batch mixing, for example.

Generally, any treatment fluid suitable for subterranean operations may be used in accordance with embodiments, including aqueous gels, viscoelastic surfactant gels, foamed gels, and emulsions, among others. Embodiments of the treatment fluid may be non-settable, in that the treatment fluid does not set and harden to develop compressive strength. Examples of suitable aqueous gels may comprise an aqueous liquid and one or more gelling agents. In some embodiments, the aqueous gel may further comprise a crosslinking agent for crosslinking the gel and further increasing the viscosity of the fluid. Examples of suitable emulsions may comprise two immiscible liquids such as an aqueous liquid or gelled liquid and a hydrocarbon. Foams may be created by incorporation of a gas, such as carbon dioxide or nitrogen. In some embodiments, the treatment fluids may comprise an aqueous-based fluid, which may include freshwater, saltwater (e.g., water containing one or more salts dissolved therein), seawater, or any other suitable aqueous liquid. The density of the water can be increased to provide additional particle transport and/or suspension capabilities. In some embodiments, the treatment fluid may comprise a non-aqueous base fluid. Suitable non-aqueous base fluids may include one or more organic liquids, such as hydrocarbons (e.g., paraffins, kerosene, xylene, toluene, or diesel), oils (e.g., mineral oils or synthetic oils), esters, and the like.

The amount of the coated particles to include in the treatment fluids is dependent on a variety of factors, including, but not limited to, the application in which the treatment fluid is to be utilized. In some embodiments, the coated particles should be present in the treatment fluids in an amount in the range of from about 0.01% to about 50% by weight of the treatment fluid. In other embodiments, the coated particle should be present in the treatment fluids in an amount in the range of from about 0.5% to about 20% by weight of the treatment fluid and, alternatively, from about 1% to about 10% by weight of the treatment fluid. While these ranges may be suitable in certain embodiments, any amount within the disclosed range may also be suitable. Those of ordinary skill in the art, with the benefit of this disclosure, will be able to select an appropriate amount of the coated particles to include in the treatment fluids of the present invention based on a variety of factors, including the application in which the fluid will be used, compatibility with other treatment fluids, and the desired swelling characteristics.

Additional additives may be added to the treatment fluids as deemed appropriate for a particular application by one skilled in the art with the benefit of this disclosure. Examples of such additives include, but are not limited to, weighting agents, surfactants, scale inhibitors, antifoaming agents, bactericides, salts, foaming agents, acids, fluid loss control additives, viscosifying agents, cross linking agents, gel breakers, shale swelling inhibitors, combinations thereof, and the like.

In certain embodiments, the treatment fluid may be a drilling fluid, a fracturing fluid, a work over fluid, a well bore cleanup fluid, a gravel packing fluid, a cement composition, or any other suitable fluids used in subterranean treatments.

In another embodiment, the treatment fluid may be a "spot treatment" or "pill," wherein the treatment is pumped into the well bore to place the coated particles in a specific portion of the well bore.

Embodiments of the methods of the present invention may be employed in a number of subterranean applications. For example, the coated particles may be used, inter alia, as a lost circulation treatment or a conformance material to prevent undesired water production. In some embodiments, a method may comprise: placing coated particles into a permeable zone of a subterranean formation, the coated particles comprising solid particles coated with an expandable coating; and allowing the coated particles to form a barrier to fluid flow in the permeable zone. The permeable zone may comprise or include fractures and/or the pore matrix of the subterranean formation. The subterranean formation may be penetrated by a well bore. The expandable coating may be pre-expanded, allowed to expand in the treatment fluid during placement in the permeable zone, or allowed to expand after placement in the permeable zone. In addition, any of the aforementioned triggers (e.g., thermal trigger, pressure trigger, chemical trigger, etc.) may be used to activate/de-activate swelling of the coated particles. According to some embodiments in which the coated particles are used, the coated particles may form a particle pack in the permeable zone that acts a substantially impermeable barrier to fluid and/or gas flow through the permeable zone of the subterranean formation.

In some embodiments, the methods of the present invention may comprise including coated particles in a treatment fluid, the coated particles comprising solid particles coated with an expandable coating that is pre-expanded; and introducing the treatment fluid into a permeable zone of a subterranean formation. The coated particles may be allowed to form a barrier to fluid flow in the permeable zone. Embodiments of the present invention contemplate that the expandable coating on the solid particles may be pre-expanded prior to formulation of the treatment fluid. In these embodiments, the expandable coating may be exposed to an actuating fluid (e.g., water, oil) prior to inclusion of the coated particles in the treatment fluid such that the expandable coating at least partially expands prior to placement into the treatment fluid. The expandable coating may undergo further expansion in the treatment fluid and/or after placement into the subterranean formation. Alternative, the expandable coating may be deactivated causing some or even all the actuating fluid to desorb such that the volume of the coated particle may be reduced for removal of the barrier in the subterranean formation.

In some embodiments, the methods of the present invention may comprise proving a treatment fluid comprising an actuating fluid and coated particles, the coated particles comprising solid particles coated with an expandable coating; and introducing the treatment fluid into a permeable zone of a subterranean formation. The coated particles may be allowed to form a barrier to fluid flow in the permeable zone. Embodiments of the present invention contemplate that the expandable coating on the solid particles may at least partially expand due to interaction with an actuating fluid that may be present in the treatment fluid. This swelling may occur, for example, while the treatment fluid is being introduced into the subterranean formation. In some embodiments, a chemical trigger may be used to reduce or prevent the swelling of the expandable coating in the treatment fluid. For example, the treatment fluid may be formulated to have a salinity and/or divalent ion concentration that reduces and/or prevents the swelling of the expandable coating due to interaction with an actuating fluid that may be present in the treatment fluid. The expandable coating may then expand or undergo further expansion due to contact with actuating fluid(s) after placement in the subterranean formation.

In some embodiments, the methods of the present invention may comprise proving a treatment fluid comprising coated particles, the coated particles comprising solid particles coated with an expandable coating; and introducing the treatment fluid into a permeable zone of a subterranean formation. The coated particles may be allowed to form a barrier to fluid flow in the permeable zone. Embodiments of the present invention contemplate that the expandable coating on the solid particles may at least partially expand due to interaction with an actuating fluid encountered after coated particles have been introduced into the subterranean formation. For example, an actuating fluid may come into contact with the barrier formed by the coated particles causing the expandable coating on the solid particles to swell, which may further decrease the permeability of the barrier to fluid flow. The actuating fluid may be introduced into the subterranean formation via the well bore or may be a formation fluid.

In some embodiments, the methods may comprise shutting in the well bore for some period of time after the treatment fluid has been introduced. The well bore may be shut in for a number of reasons, including allowing the coated particles to undergo a desired level of expansion. In addition, the well bore may also be shut in to provide a shut-in pressure that activates/de-activates swelling of the coated particles. In some embodiments, the shut-in time may comprise a period of time from about one hour to about one month or even longer. In some embodiments, the shut-in tome may comprise a period of time from about three hours to about fifteen hours.

In some embodiments, methods of using the coated particles in a lost-circulation treatment may comprise: providing a treatment fluid comprising coated particles, the coated particles comprising solid particles coated with an expandable coating; introducing the treatment fluid into a lost-circulation zone of a subterranean formation such that the coated particles form a barrier to fluid flow in the lost-circulation zone. For example, the treatment fluid may be introduced into a well bore penetrating the subterranean formation and allowed to circulate through the well bore at least to the zone where loss of fluid circulation is believed to be occurring. The lost-circulation zone may comprise or include fractures and/or the pore matrix of the subterranean formation. The expandable coating may be pre-expanded, allowed to expand in the treatment fluid during placement in the permeable zone, and/or allowed to expand after placement in the lost-circulation zone. In addition, any of the aforementioned triggers (e.g., thermal trigger, pressure trigger, chemical trigger, etc.) may be used to activate/de-activate swelling of the coated particles in the lost-circulation treatment. According to some embodiments in which the coated particles are used, the coated particles may form a particle pack in the lost-circulation zone that acts as a substantially impermeable barrier to fluid and/or gas flow through the lost-circulation zone of the subterranean formation. The particle pack may be formed, for example, by packing off perforation tunnels, plating off a formation surface, plating off a hole behind a slotting liner, or packing along the surface of a hydraulic fracture. In certain embodiments, the barrier formed by the solid particles may reduce and/or eliminate the loss of drilling fluids and/or other treatment fluids into the lost-circulation zone.

In example embodiments of a lost-circulation treatment, the treatment may comprise including coated particles in a drilling fluid, the coated particles comprising solid particles coated with an expandable coating; using a drill bit to enlarge a well bore penetrating a subterranean formation; and circulating the drilling fluid past the drill bit. In some embodiments, the drilling fluid can be allowed to circulate in the well bore such that the coated particles form a barrier to fluid flow in a lost-circulation zone in the subterranean formation.

In some embodiments, methods of using the coated particles in a conformance treatment may comprise: providing a treatment fluid comprising coated particles, the coated particles comprising solid particles coated with an expandable coating; introducing the treatment fluid into a permeable zone of a subterranean formation such that the coated particles form a barrier to fluid flow in the permeable zone. The permeable zone may comprise or include fractures and/or the pore matrix of the subterranean formation. The subterranean formation may be penetrated by a well bore. The expandable coating may be pre-expanded, allowed to expand in the treatment fluid during placement in the permeable zone, and/or allowed to expand after placement in the permeable zone. In addition, any of the aforementioned triggers (e.g., thermal trigger, pressure trigger, chemical trigger, etc.) may be used to activate/de-activate swelling of the coated particles in the conformance treatment. According to some embodiments in which the coated particles are used, the coated particles may form a particle pack in the permeable zone that acts a substantially impermeable barrier to fluid and/or gas flow through the permeable zone of the subterranean formation. In certain embodiment, the fluid that is blocked may be water from water-flooding operations, e.g., water that has been introduced into the subterranean formation from neighboring wells during secondary recovery operations. In some embodiments, the barrier formed by the coated particles may prevent the influx of water into the well bore, improving the water-to-hydrocarbon ratio in the hydrocarbons that are produced through the well bore. The water can be the result of a water-producing zones communicating with the hydrocarbon-producing formations or zones by fractures, high-permeability streaks, and the like. Alternatively, the water can be caused by a variety of other occurrences which are well known in the art, including water coning, water cresting, bottom water, channeling at the well bore, etc.

In some embodiments, the barrier formed by the solid particles in the permeable zone of the subterranean formation may be removed. Embodiments of the present invention may further comprise removing the barrier formed by the solid particles from the subterranean formation such that permeability of the permeable zone may be at least partially restored. In some embodiments, the permeable zone may be restored to its pre-treatment permeability. Restoration of permeable may be desired, for example, to allow the maximum flow of produced fluids from the permeable zone into the well bore. De-activation of the swelling of the expandable coating may be used, for example, to decrease volume of the coated particles in the barrier to facilitate removal. Any of the aforementioned triggers (e.g., thermal trigger, pressure trigger, chemical trigger, etc.) may be used to de-activate swelling of the coated particles for removal. By way of example, the barrier may be contacted by a fluid having a salinity and/or divalent ion concentration that causes the expandable coating to desorb the actuating fluid and, thereby, decrease in volume. In some embodiments, the fluid may effect the decrease in volume and/or remove the coating from the solid particles and then carry the coated particles or resultant solid particles out of the well bore. In alternative embodiments, a pressure and/or thermal trigger may be used to cause the expandable coating to de-activate and, thus, desorb the actuating fluid to decrease in volume. The coated particles after the decrease in volume may then be displaced from the subterranean formation, for example, by circulating a post-flush fluid through the well bore to come into contact with the coated particles and carry them back out of the well bore.

In some embodiments, the coated particles may be used to reduce fluid loss from a treatment fluid introduced into a subterranean formation. The subterranean formation may be penetrated by a well bore with the treatment fluid introduced into the well bore. It is believed that the coated particles may act to reduce fluid loss by blocking pore throats or flow channels in the subterranean formation. A solid particle with an expandable coating may be used to block larger pore throats or other flow channels than just the solid particles alone. In addition, without being limited by theory, if a filter cake is formed that comprises the solid particles and then the expandable coating is allowed to expand, the expansion could fill in gaps between the solid particles that would otherwise allow leakage of the treatment fluid if just the solid particles alone were used. In some embodiments, coated particles may be used to reduce fluid loss from a drilling fluid. The expandable coating may be pre-expanded, allowed to expand in the treatment fluid during placement in the permeable zone, or allowed to expand after placement in the permeable zone. In addition, any of the aforementioned triggers (e.g., thermal trigger, pressure trigger, chemical trigger, etc.) may be used to activate/de-activate swelling of the coated particles.

In some embodiments, the coated particles may be used to modify the rheology profile of a treatment fluid, such as a drilling fluid. For example, expansion of the expandable coating to increase in volume should increase the viscosity of a treatment fluid in which the coated particles are included. Expansion of the coating and resulting viscosity increase may be beneficial in a number of applications where low shear rheology and increased fluid carrying capacity are desired, such as in packer applications, among others. In packer applications, for example, the increased viscosity would aid in keeping weighting materials in place and thermal induced currents minimized. By way of further example, reduction in volume of the expandable coating should decrease the volume of a treatment fluid in which the coated particles are included. A reduction in viscosity may be beneficial in a number of applications such as well bore cleanup or prior to cementing to reduce the equivalent circulating density of the fluid and improve zonal isolation.

It should be understood that the compositions and methods are described in terms of "comprising," "containing," or "including" various components or steps, the compositions and methods can also "consist essentially of" or "consist of" the various components and steps. Moreover, the indefinite articles "a" or "an," as used in the claims, are defined herein to mean one or more than one of the element that it introduces.

For the sake of brevity, only certain ranges are explicitly disclosed herein. However, ranges from any lower limit may be combined with any upper limit to recite a range not explicitly recited, as well as, ranges from any lower limit may be combined with any other lower limit to recite a range not explicitly recited, in the same way, ranges from any upper limit may be combined with any other upper limit to recite a range not explicitly recited. Additionally, whenever a numerical range with a lower limit and an upper limit is disclosed, any number and any included range falling within the range are specifically disclosed. In particular, every range of values (of the form, "from about a to about b," or, equivalently, "from approximately a to b," or, equivalently, "from approximately a-b") disclosed herein is to be understood to set forth every number and range encompassed within the broader range of values even if not explicitly recited. Thus, every point or individual value may serve as its own lower or upper limit combined with any other point or individual value or any other lower or upper limit, to recite a range not explicitly recited.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Although individual embodiments are discussed, the invention covers all combinations of all those embodiments. Furthermore, no limitations are intended to the details of construction or design herein shown, other than as described in the claims below. Also, the terms in the claims have their plain, ordinary meaning unless otherwise explicitly and clearly defined by the patentee. It is therefore evident that the particular illustrative embodiments disclosed above may be altered or modified and all such variations are considered within the scope and spirit of the present invention. If there is any conflict in the usages of a word or term in this specification and one or more patent(s) or other documents that may be incorporated herein by reference, the definitions that are consistent with this specification should be adopted.

What is claimed is:

1. A method of drilling a well bore comprising:
   including coated particles in a drilling fluid, the coated particles comprising solid particles coated with an expandable coating;
   using a drill bit to enlarge the well bore;
   circulating the drilling fluid past the drill bit; and
   allowing the expandable coating to expand, wherein an expansion of the expandable coating is controlled by divalent ions.

2. The method of claim 1 wherein the solid particles comprise a lost circulation material selected from the group consisting of a ground peanut shell, mica, cellophane, ground walnut shell, calcium carbonate, plant fiber, a cottonseed hull, ground rubber, polymeric material, petroleum coke, graphitic carbon, and any combination thereof.

3. The method of claim 1 wherein the solid particles comprise a weighting agent selected from the group consisting of hematite, hausmannite, barite, sand, silica flour, cement, Illmanite, calcium carbonate, manganese oxide, manganese tetraoxide, and any combination thereof.

4. The method of claim 1 wherein the expandable coating comprises a water-swellable material.

5. The method of claim 1 wherein the expandable coating comprise a hydrogel.

6. The method of claim 1 wherein the expandable coating comprises a polymer selected from the group consisting of a polyacrylate, a polymethacrylate, polyacrylamide, a starch-polyacrylate acid graft copolymer, a polyethylene oxide polymer, a carboxymethyl cellulose polymers, poly (acrylic acid) and salts thereof, poly(acrylic-co-acrylamide), graft-poly(ethylene oxide) of poly(acrylic acid), poly(2-hydroxyethyl methacrylate), poly(2-hydroxypropyl methacrylate), polyvinyl alcohol cyclic acid anhydride graft copolymer, isobutylene maleic anhydride copolymer, vinylacetate-acrylate copolymer, a starch-polyacrylonitrile graft copolymers, a starch, a modified starch, a hydrophobically modified polymer, and any combination thereof.

7. The method of claim 1 wherein the expandable coating comprises an oil-swellable material.

8. The method of claim 1 wherein the expandable coating comprise an oil-swellable material selected from the group consisting of natural rubber, polyurethane rubber, nitrile rubber, hydrogenated nitrile rubber, acrylate butadiene rubber, polyacrylate rubber, butyl rubber, brominated butyl rubber, chlorinated butyl rubber, chlorinated polyethylene rubber, isoprene rubber, chloroprene rubber, neoprene rubber, butadiene rubber, styrene butadiene copolymer rubber, sulphonated polyethylene, ethylene acrylate rubber, epichlorohydrin ethylene oxide copolymer rubber, ethylene-propylene-copolymer (peroxide cross-linked), ethylene-propylene-copolymer (sulphur cross-linked), ethylene-propylene-diene terpolymer rubber, ethylene vinyl acetate copolymer, a fluoro rubber, a fluoro silicone rubber, a silicone rubber, poly 2,2,1-bicyclo heptene (polynorborneane), alkylstyrene, a crosslinked substituted vinyl acrylate copolymer, any combination thereof.

9. The method of claim 1 wherein the coated particles are introduced into a permeable zone of the subterranean formation such that the coated particles form a barrier to fluid flow in the permeable zone.

10. The method of claim 9 wherein the permeable zone is a lost circulation zone, the coated particles preventing loss of other fluids into the permeable zone from a well bore penetrating the subterranean formation, wherein the well bore penetrates the subterranean formation.

11. The method of claim 9 wherein the coated particles block flow of water from the permeable zone into a well bore, wherein the well bore penetrates the subterranean formation.

12. The method of claim 9 further comprising removing the barrier to fluid flow formed by the coated particles, the removing comprising decreasing volume of the coated particles in the barrier to facilitate removal.

13. The method of claim 9 further comprising removing the barrier to fluid flow formed by the coated particles, the removing comprising contacting the coated particles with a fluid comprising a chemical trigger to de-activate swelling of the coated particles, wherein the chemical trigger is selected from the group consisting of a dissolved salt, a divalent ion, and combinations thereof.

14. The method of claim 1 wherein the expandable coating expands in volume in a treatment fluid used in introducing the coated particles into the subterranean formation.

15. The method of claim 1 wherein the coated particles are provided with the expandable coating in an expanded configuration.

16. The method of claim 1 further comprising contacting the coated particle with an actuating fluid to facilitate the expansion of the expandable coating.

17. The method of claim 16 wherein the actuation fluid comprises a formation fluid.

18. The method of claim 1 wherein the coated particles expand or contract in volume in the drilling fluid to change the rheology profile of the drilling fluid.

19. A method of drilling a well bore in a subterranean formation comprising:
   including coated particles in a drilling fluid, the coated particles comprising solid particles coated with an expandable coating, the drilling fluid comprising divalent ions to control swelling of the expandable coating;

using a drill bit to enlarge the well bore;

circulating the drilling fluid past the drill bit;

allowing at least a portion of the coated particles to form a particle pack in the subterranean formation, wherein the coated particles are pre-expanded, expand during placement in the subterranean formation, and/or expand after placement in the subterranean formation to form a barrier to fluid flow; and contacting the coated particles with a fluid having a divalent ion concentration that causes the expandable coating to decrease in volume.

20. The method of claim 19, further comprising contacting the coated particles in the particle with an actuating fluid to cause the expandable coating to expand.

* * * * *